(No Model.) 2 Sheets—Sheet 1.
T. MABBETT.
APPARATUS FOR CUTTING AND SLICING VEGETABLES, FRUIT, &c.
No. 597,009. Patented Jan. 11, 1898.
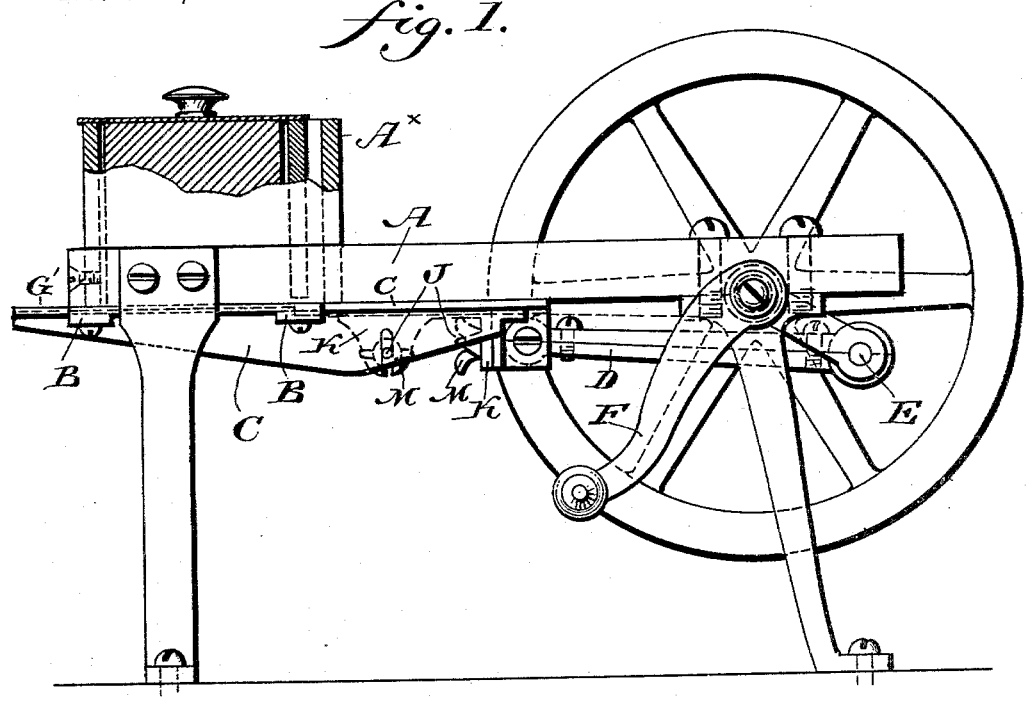
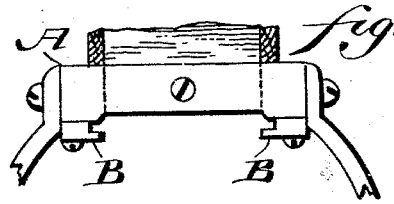
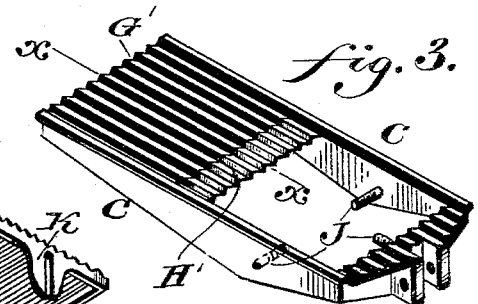
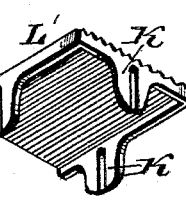
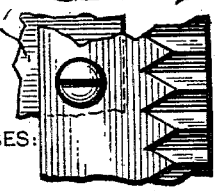
WITNESSES:
L. Douville,
O. F. Fagle.
INVENTOR
Truman Mabbett
BY
John A. Wiedersheim
ATTORNEY.
THE NORRIS PETERS CO., PHOTO-LITHO., WASHINGTON, D. C.

(No Model.) 2 Sheets—Sheet 2.
T. MABBETT.
APPARATUS FOR CUTTING AND SLICING VEGETABLES, FRUIT, &c.
No. 597,009. Patented Jan. 11, 1898.
*fig. 9.*
*fig. 10.*
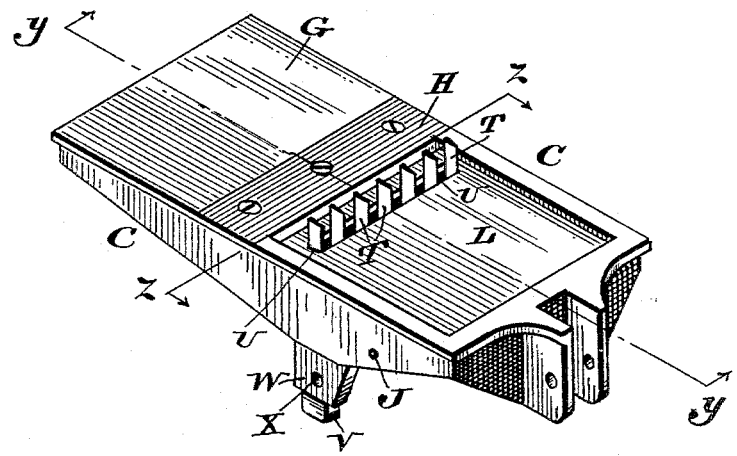
*fig. 11.*
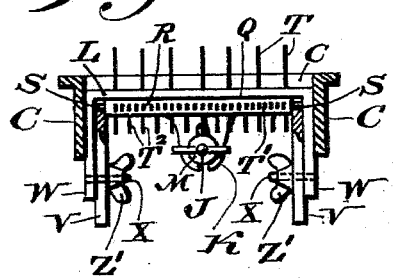
*fig. 12.*
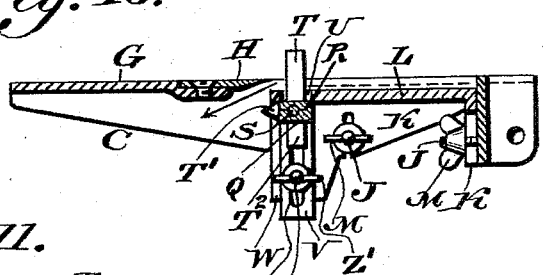
*fig. 13.*
WITNESSES:
L. Douville,
P. H. Nagle.
INVENTOR
Truman Mabbett,
BY John A. Wiedersheim
ATTORNEY.
THE NORRIS PETERS CO., PHOTO-LITHO., WASHINGTON, D. C.

UNITED STATES PATENT OFFICE.

TRUMAN MABBETT, OF VINELAND, NEW JERSEY.

APPARATUS FOR CUTTING AND SLICING VEGETABLES, FRUIT, &c.

SPECIFICATION forming part of Letters Patent No. 597,009, dated January 11, 1898.

Application filed November 5, 1895. Serial No. 568,019. (No model.)

*To all whom it may concern:*

Be it known that I, TRUMAN MABBETT, a citizen of the United States, residing at Vineland, in the county of Cumberland, State of New Jersey, have invented a new and useful Improvement in Apparatus for Cutting and Slicing Vegetables, Fruit, &c., which improvement is fully set forth in the specification and accompanying drawings.

My invention consists of an apparatus for cutting vegetables, fruit, &c., having a frame with a traveler movable thereon, an adjustable gage secured to a table on said frame, and a cutting-knife, said parts being arranged and combined as hereinafter described.

It further consists of a novel slicing device which is detachably secured to said gage, so that it may be used in connection with the cutting device when so desired.

It further consists of the combination and arrangement of parts hereinafter set forth and claimed.

Figure 1 represents a partial side elevation and partial vertical section of a vegetable or fruit cutter embodying my invention, the slicing device being omitted. Fig. 2 represents an end view of a portion thereof. Fig. 3 represents a perspective view of a modified form of the gage, the bed of the table and the cutting-knife being shown as corrugated. Fig. 4 represents a perspective view of a modified form of the gage. Fig. 5 represents a vertical longitudinal portion of the table with cutting-knife, the slicing-knife being omitted. Fig. 6 represents a bottom plan view of a portion of the modified or corrugated form of cutting-knife. Fig. 7 represents an end view of the modified or corrugated form of the cutting-blade. Fig. 8 represents an end view of the modified form of the blade and gage. Fig. 9 represents a perspective view of the bed, blade, and gage as embodying my invention, including the knives of the slicing device. Fig. 10 represents a longitudinal vertical section on line $y\,y$, Fig. 9. Fig. 11 represents a transverse vertical section on line $z\,z$, Fig. 9. Fig. 12 represents a perspective view of the slicing-knives with supporting-bar. Fig. 13 represents one of the side supports of the slicing device.

Similar letters of reference indicate corresponding parts in the several figures.

Referring to the drawings, A designates a frame which is provided with the slides or ways B, on which is mounted the traveler C, to which reciprocating motions are imparted by means of the pitman D and crank-shaft E, the latter receiving power in any suitable manner, in the present case by the crank-handle F.

Secured to the traveler is the table G, the inner end of which has secured to it the blade H, said table and blade occupying a portion of said traveler. On the sides of the remaining portion of the traveler are screws J, which enter the slots of the ears K, the latter depending from the bed or gage L, said screws being provided with nuts M, whereby said gage may be vertically adjusted, it being noticed that the ears K are on the opposite sides and ends of the gage, so that the latter may be adjusted in vertical position and in its movement remain horizontal throughout, by which provision the vegetable, fruit, or other article placed upon said gage may be presented to the blade H in parallel lines, so as to be cut true throughout the length of said articles instead of being presented at an inclination to said blade.

Q designates a slicing device, the same consisting of the cross-bar R, with journals S on the ends thereof, and the radiating knives T T' T² in series, the knives of the different series being separated or spaced to varying extent, so that the fruit or vegetable having been cut in longitudinal direction by the blade H may be sliced or severed into pieces of different widths, according to the nature of the blade brought into service, it being noticed, as in Figs. 9 and 10, that the knives employed are inserted from below in the throat U of the gage L, it being evident that the device Q may be removed and rotated, so that the required knives may be employed.

In order to hold the bar R in position, the journals S thereof are supported on the vertically-sliding plates V, which are attached to the hangers W on the sides of the gage L by means of the screws X, which latter pass through the slots Z in said plates and are provided with nuts Z', so as to tighten against and retain said plates V, and consequently the device, in adjusted position.

In operating the device the gage is adjusted as required, and the vegetable or other article to be cut is placed in the hopper, which is secured to the frame A, and motion is imparted to the traveler, so that the blade H and knives T, which are attached, if slicing in combination with the cutting is desired, are forced against the said vegetable, cutting and slicing the same, the pieces passing through the throat between the gage and blade.

In Figs. 3, 6, and 7, C' designates a modified form of the table, and H' a modified form of the cutting-knife, the same being corrugated or zigzag in cross-section, and in Fig. 4 L' designates a modified form of the gage, the top thereof being corrugated instead of plain.

Having thus described my invention, what I claim as new, and desire to secure by Letters Patent, is—

1. In a vegetable-slicer, a frame with ways thereon, a reciprocating traveler having a horizontal table connected therewith at one end thereof, horizontal pins projecting from the inner side wall and inner end of said traveler, a gage with slotted depending ears on its sides and one end registering with said pins, clamping-nuts on threaded ends of said pins, and a blade secured to the inner end of said table, and means connected with the said traveler and said frame for imparting a reciprocating motion to said traveler.

2. A combined vegetable cutter and slicer having a frame, a traveler reciprocating in ways on said frame, a gage vertically adjustable on said traveler and having a throat therein, slotted plates vertically adjustable on said gage, a connecting cross-bar for said slotted plates and a series of parallel knives connected with said cross-bar and projecting upwardly through said throat and above said traveler.

TRUMAN MABBETT.

Witnesses:
JOHN A. WIEDERSHEIM,
A. P. JENNINGS.